United States Patent [19]
Isenberg et al.

[11] Patent Number: 5,570,295
[45] Date of Patent: Oct. 29, 1996

[54] SYSTEM AND METHOD OF CAPTURING ENCODED DATA TRANSMITTED OVER A COMMUNICATIONS NETWORK IN A VIDEO SYSTEM

[75] Inventors: David S. Isenberg; Mark L. Tuomenoksa, both of Shrewsbury, N.J.

[73] Assignee: Lucent Technologies Inc., Murray Hill, N.J.

[21] Appl. No.: 210,802

[22] Filed: Mar. 18, 1994

[51] Int. Cl.⁶ .................................................. G06F 17/00
[52] U.S. Cl. ....................................................... 364/514 R
[58] Field of Search .......................... 364/514 R; 379/96, 379/97, 98, 90, 93, 110; 455/4.1; 348/134, 13, 15, 14

[56] References Cited

U.S. PATENT DOCUMENTS

| | | | |
|---|---|---|---|
| 4,456,925 | 6/1984 | Skerlos et al. | 358/85 |
| 4,734,764 | 3/1988 | Pocock et al. | 358/86 |
| 4,860,123 | 8/1989 | McCalley et al. | 358/342 |
| 4,905,094 | 2/1990 | Pocock et al. | 358/342 |
| 4,941,040 | 7/1990 | Pocock et al. | 358/86 |
| 5,014,125 | 5/1991 | Pocock et al. | 358/86 |
| 5,051,822 | 9/1991 | Rhoades | 358/86 |
| 5,089,885 | 2/1992 | Clark | 358/86 |
| 5,191,410 | 3/1993 | McCalley et al. | 358/86 |
| 5,236,199 | 8/1993 | Thompson, Jr. | 273/439 |
| 5,262,860 | 11/1993 | Fitzpatrick | 379/92 |
| 5,410,326 | 4/1995 | Goldstein | 348/134 |
| 5,418,625 | 5/1995 | Shimoosawa | 379/93 |

FOREIGN PATENT DOCUMENTS

| | | | |
|---|---|---|---|
| 3536844A1 | 4/1987 | Germany | H04M 1/00 |
| 2207838 | 2/1989 | United Kingdom | H04M 11/08 |

OTHER PUBLICATIONS

King; "Device For The Integration of Television and Telephone Control Via Hand Held Infrared Remote"; Wescanex 1991.

*Primary Examiner*—Ellis B. Ramirez
*Attorney, Agent, or Firm*—Mark K. Young; Michele L. Conover

[57] ABSTRACT

A video system that captures telephone number data encoded into video signals transmitted over a video network to at least one display device is disclosed. Video signals are received that contain an escape sequence demarcating telephone number data. The system identifies the escape sequence, and captures the telephone number data. Upon command, dialing data corresponding to the telephone number data are transmitted over a telephone network to initiate a telephone call to the desired party.

25 Claims, 3 Drawing Sheets

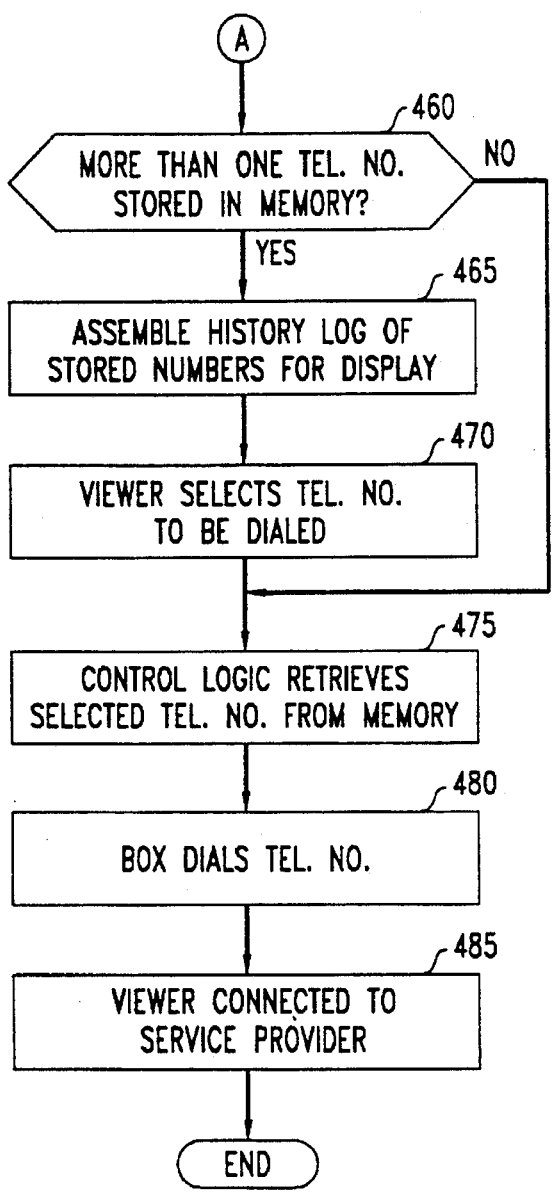

SYSTEM AND METHOD OF CAPTURING ENCODED DATA TRANSMITTED OVER A COMMUNICATIONS NETWORK IN A VIDEO SYSTEM

BACKGROUND OF THE INVENTION

The present invention relates to video systems.

As the complexities of modern life increase, it becomes more and more desirable to simplify the way everyday tasks are accomplished. One solution has been provided by cable network providers, who provide various programs that promote consumer services. One particular consumer service that has grown in popularity is home shopping.

Specifically, many cable network providers broadcast home-shopping programs in which items for purchase are displayed on a television screen. Each item is displayed and described by a program host. The telephone number of the service provider promoting the item is also displayed. A viewer wishing to purchase a particular item can place an order by picking up a telephone handset, dialing the displayed telephone number and interacting verbally with a live operator to provide necessary ordering information. This service requires the viewer to memorize or write down the telephone number prior to accessing the service.

Other types of information services or programs have a similar format. For example, real estate programs broadcast video segments of homes for sale in a particular geographical area. Typically, each video segment includes the name of the realtor, the realtor's phone number and a brief description of the home. A viewer interested in a particular home can pick up the telephone handset, dial the displayed phone number and schedule an appointment with the listed real estate agent.

Indeed, even many ordinary commercials invite the viewer to dial the telephone number of the advertiser. For example, commercials soliciting subscription to a particular telephone billing plan invariably include the telephone number of the telephone company providing the plan. The commercials typically highlight the desirability of the billing plan and try to entice the viewer to seek additional information about the plan. A viewer interested in the billing plan can dial the displayed telephone number and speak with a company representative to obtain additional information and/or subscribe to the plan. However, the viewer must record or memorize the telephone number prior to accessing the service.

SUMMARY OF THE INVENTION

The present invention is directed to an advantageous improvement for accessing such services. We have recognized that the ability to capture telephone number data and use the data to dial a corresponding telephone number can make it easier for the viewer to access services advertised on the system. In accordance with the present invention, data representing the telephone number of the service provider are transmitted over a communications network that carries the video signal. The data are then captured by a telephony-capable component of the viewer's video system, illustratively a set-top box, in such a way that the viewer can access the service provider by signaling the set-top box to dial the captured telephone number, and thereby initiate a telephone call from the viewer to the service provider. Advantageously, the telephone number data may be demarcated by an escape sequence that is recognized by the set-top box. The escape sequence comprises a sequence of special characters not commonly used, hence easily recognized.

The set-top box is connected to the telephone network so that information such as voice signals and data signals may be transmitted between the viewer's video system and the service provider. The set-top box may include an interface for a telephone or another communication device, such as a speaker phone, by which the viewer may communicate with the service provider. The communication device may also be directly integrated into the set-top box.

In various embodiments of the invention, one or more of the telephone numbers captured from different programs can be stored in the set-top box. A history log of the captured numbers each identified with supplementary text that was transmitted in the same way as, and contiguous with the number, can be assembled and displayed for the viewer. The viewer can then selectively signal the set-top box to dial a particular telephone number.

In accordance with one feature of the present invention, the telephone number data can be captured in the set-top box selectively, e.g., the capturing mechanism can be selectively enabled/disabled by the viewer. For example, the viewer can transmit an access code which is recognized by the set-top box, causing the capturing mechanism to be enabled and the set-top box to capture the data.

In accordance with another feature of the present invention, the escape sequence demarcating the data, and the data itself, can be encoded into the vertical blanking interval of the video signal which illustratively may be an NTSC signal. In the case of a digital broadcast, the data identified by the escape sequence may alternatively be digitally encoded into any convenient portion of the digital data bitstream of the broadcast.

In accordance with another feature of the present invention, the set-top box may be directly integrated into a viewer's display device.

BRIEF DESCRIPTION OF THE DRAWER

FIGS. 4 and 5 illustrate a flow chart depicting a method of capturing encoded data transmitted over a communications network in accordance with the present invention.

FIG. 6 illustrates a display of a history log assembled by the set-top box of FIG. 2.

DETAILED DESCRIPTION

Figure 1:
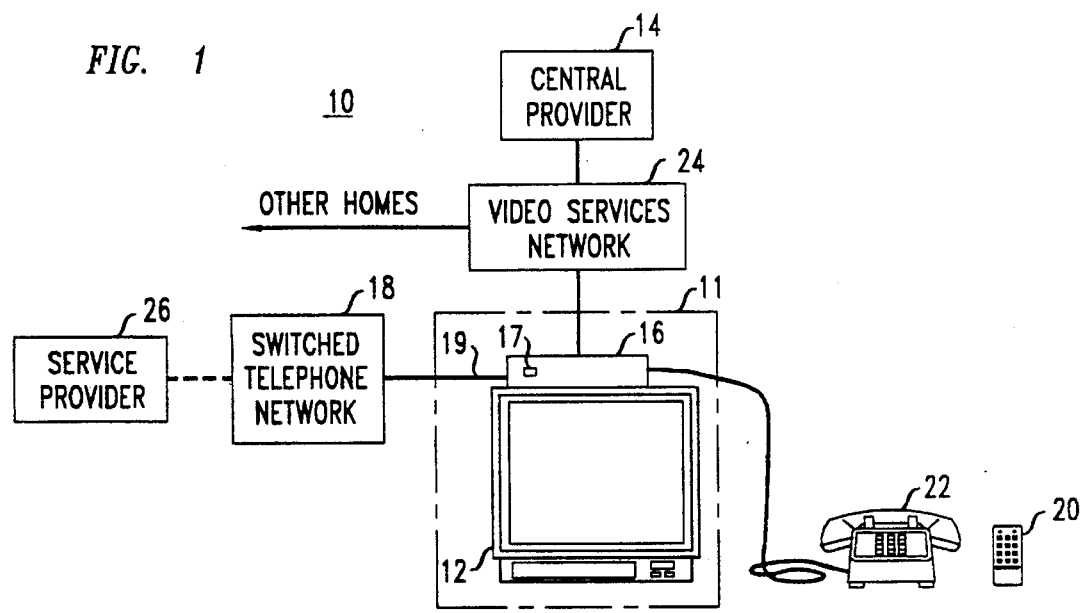
FIG. 1 illustrates a schematic diagram of an interactive communications system implemented in accordance with the present invention.

Referring to FIG. 1, there is shown an interactive communication system 10 that incorporates the principles of the present invention. A video receiving device 11 receives video signals from a central provider 14 of video services over a video services network 24. The video receiving device 11 illustratively comprises a display device 12 and a set-top box 16. The set-top box 16 is also connected to a switched telephone network 18. Access to the telephone network 18 is illustratively via a separate telephone line 19, but may be over the same network 24 which provides the video signals. The set-top box 16 may receive commands from the viewer via a remote control device, illustratively an infrared remote control unit 20, a dual tone multifrequency (DTMF) generating device, illustratively telephone 22, or a special mechanism (not shown), such as a keypad which is part of the display device or set-top box control panel.

In various systems embodying the present invention, the display device 12 may be a television, personal computer, work station, broadcast receiving system, or other type of device for displaying video signals. The set-top box 16 may be an appropriately modified game playing device, video cassette recorder, cable television interface, computer network interface or satellite television receiver. The central provider 14 of video services may be a broadcast TV station, cable television (CATV) headend, satellite earth station, closed-circuit video theater, computer network, or any other video system or device for transmitting a video program to the display device 12 over the network 24. The network 24 may be an over-the-air, satellite or cabled broadcast, or switched video network. The video signals may be broadcast in either digital or analog form.

In operation, the central provider 14 broadcasts a program created, sponsored or promoted by illustratively a particular commercial service provider 26. The service provider 26 may be a company advertising a particular service or product over the network, or may be an individual or group of individuals. In accordance with the invention, telephone number data, which illustratively correspond to the telephone number of service provider 26, are encoded into the program. As a viewer watches the program on his display device 12, the telephone number data are captured by the viewer's set-top box 16. A visual indicator 17, such as an LED indicator, or screen display (not shown) located on the set-top box indicates when telephone number data has been captured. When the viewer wishes to dial the captured telephone number, the viewer transmits an access signal to the set-top box 16. The set-top box 16 dials the call, illustratively by generating DTMF tones corresponding to the telephone number data and dials the service provider 26. When the call is connected, the viewer can directly interact with the service provider 26.

Figure 2:
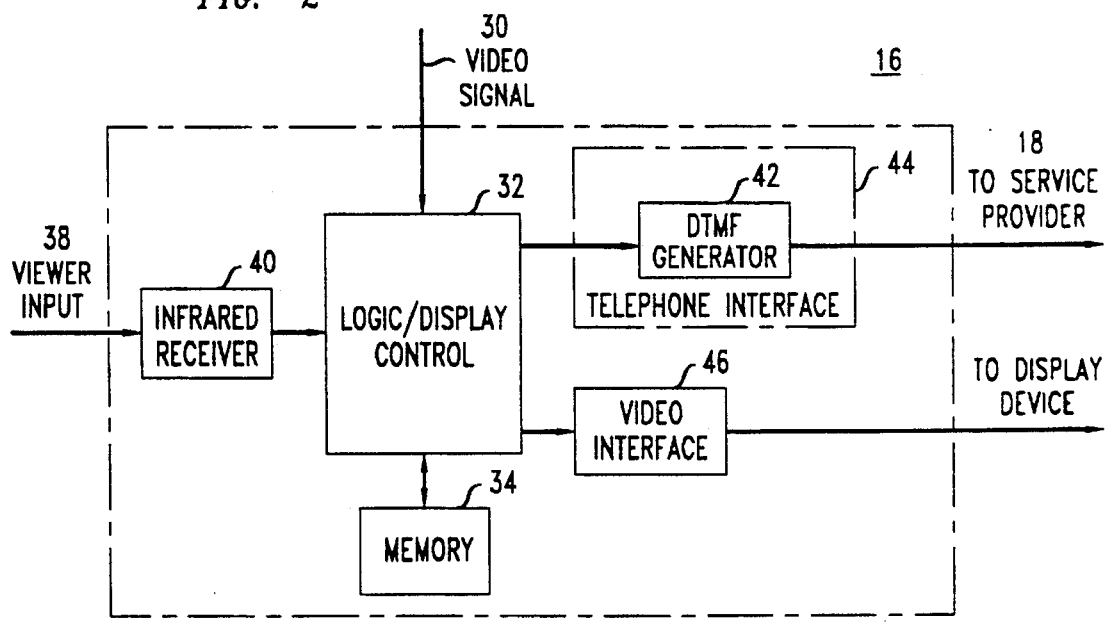
FIG. 2 illustrates a block diagram of the set-top box of the interactive communications system of FIG. 1.

FIG. 2 depicts the set-top box 16 of FIG. 1 in more detail. The video signal transmitted by the central provider 14 is received by logic/display control 32 on lead 30. The video signal containing the program is transmitted to the display device 12, by a video interface 46, illustratively an NTSC interface. The interface 46 may also be of the type required for transmitting a digital video signal, such as a high definition television (HDTV) signal, or any other protocol for transmitting full motion video, such as MPEG I or MPEG II. Detected within the video signal are telephone number data encoded into the signal which are thereupon stored in memory 34. The telephone number data are preferably demarcated by an escape sequence which is recognized by the logic/display control 32 as is described in more detail below. In accordance with one embodiment of the present invention, a capture-enable signal, illustratively an infrared signal, is transmitted via the remote control unit 20 and received as an electrical signal on lead 38 by receiver 40 which causes the logic/display control 32 to capture any available telephone number data. The capture-enable signal could also be a DTMF signal, transmitted from the viewer's telephone 22 and received locally by the set-top box 16. The set-top box need not transmit the captured DTMF signal over the telephone interface. The captured telephone number data are stored in memory 34.

Access signals, transmitted by the viewer in a manner similar to the capture-enable signal, cause the logic/display control 32 to retrieve the telephone number data from memory 34. It is to be understood that the capture-enable signal could incorporate the access signals so that the viewer can signal the device to both capture the telephone number data and dial the corresponding telephone numbers. Once the set-top box 16 receives the access signals, the telephone interface enters an off-hook state and dials the telephone number over the switched telephone network 18. The dialing of the telephone number can be accomplished by a number of different means including pulse dialing, DTMF dialing or out of band signalling. Illustratively, DTMF generator 42 generates DTMF tones corresponding to the telephone number data and transmits the tones via telephone interface 44. In other embodiments of the invention, the connection to the service provider 26 may be established by transmitting computer commands or network commands.

The ability to capture telephone number data and use the data to dial a corresponding telephone number can make it easier for the viewer to access services advertised on the system. For example, a viewer may be watching a home shopping program and see a product that the viewer is interested in purchasing. The viewer can initiate the capturing and dialing of the telephone number by inputting the appropriate access code, via the remote control unit 20. Illustratively, this could be a special "dial" button on the remote control unit 20 or set-top box 16. Once the viewer is connected to the service provider, the viewer can order the desired product or request additional information. Other types of services which the viewer may access include, but are not limited to, obtaining tickets to sporting or entertainment events, obtaining travel information such as airline reservations, or obtaining program transcripts and real estate listing information.

As described above, the telephone number data are preferably demarcated by an escape sequence that is encoded into the program when the program is recorded or transmitted. In the case of a live broadcast, the escape sequence and the telephone number data are encoded directly into the broadcast. The escape sequence and telephone number data are illustratively encoded into the vertical blanking interval of at least one of the video frames comprising the program. If the system broadcasting the program is a digital system, the escape sequence and telephone number data alternatively may be digitally encoded into any other convenient portion of the digital data bitstream of the broadcast. In the case of a digital telephony protocol with out of band (OOB) signalling, such as ISDN, the escape sequence can be encoded into the OOB channel.

The escape sequence may be any type of conventional escape sequence which comprises a sequence of special characters not commonly used in the encoding of the video data. For example, escape sequences similar to those used for encoding closed caption data may be used to demarcate the telephone number data. Additional data such as, for example, data indicative of the product or service being advertised, date, time and/or the name of the service provider can also be included with the telephone number data. The additional data can also be included with the telephone number data or can be sent after the connection has been placed with the service provider.

Figure 3:
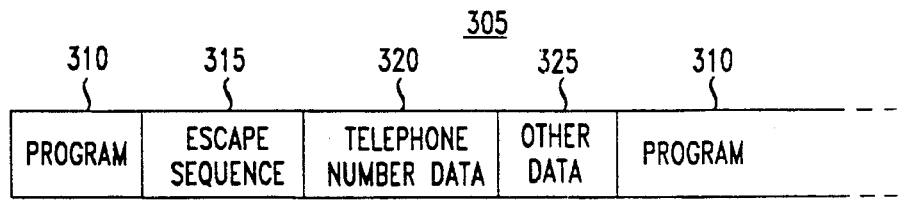
FIG. 3 is an illustrative format of a video signal which includes an escape sequence demarcating telephone number data which is captured by the set-top box of FIG. 2.

FIG. 3 is an illustrative format of a video signal 305 that is received by the set-top box 16. Video signal 305 is transmitted from the central provider 14 and comprises a program 310 or commercial advertisement. For example, the program could be a home shopping program or other type of information service program.

Encoded into the video signal 305 is escape sequence 315 that demarcates telephone number data 320 and optionally other data 325 of the type described above. Illustratively, program 310 represents a video frame and escape sequence 315 is encoded into the vertical retrace interval following the frame. Referring to FIG. 2, the video signal 305 is received by logic/display control 32, detects the escape sequence 315 and captures the subsequent data. The logic/display control also determines the destination of the data, i.e., whether it should be transmitted to the display device or captured in memory. The program 310 is received by the logic/display control 32 and transmitted to the display device on lead 35. When the logic/display control 32 detects escape sequence 315, the telephone number data 320 and other data 325 are extracted from the video signal 305 and stored in memory 34.

Figure 4:
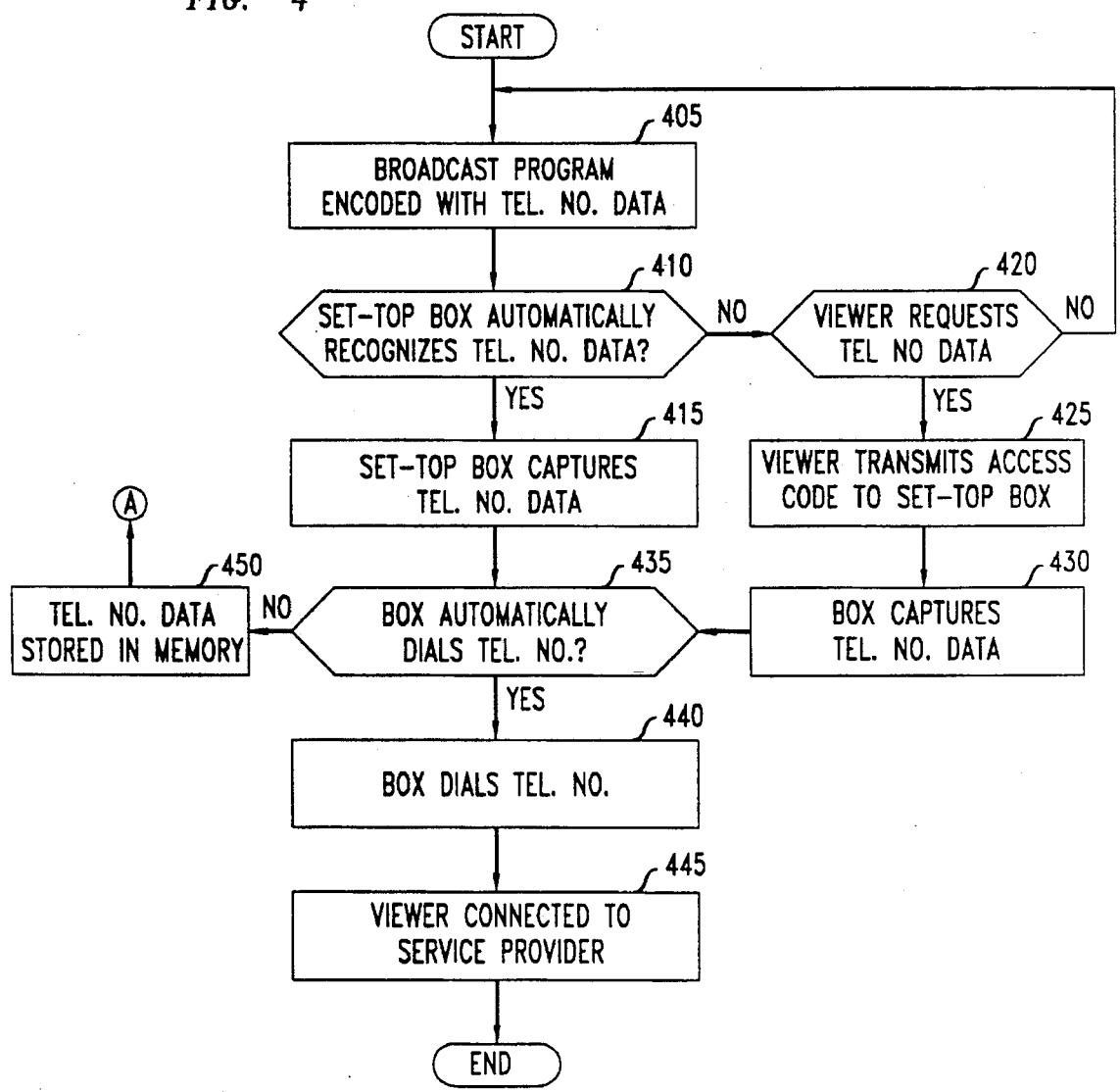

FIGS. 4 and 5 depict various methods of extracting telephone number data from a broadcast program. A broadcast program encoded with an escape sequence demarcating telephone number data is broadcast over a video network in the manner described above (step 405). Next, it is determined if the set-top box can automatically capture the telephone number data, i.e., without any intervention by the viewer (step 410). For example, the set-top box may automatically capture the telephone number data from any program viewed by the viewer or any program specified by the viewer. Alternatively, the viewer may have the capability to selectively enable the set-top box to capture telephone number data only from certain types of programs, such as, real estate programs. In such a case, identifying data such as, for example, data indicating the type of product advertised or the name of the service provider, is included with the telephone number data. As the video signals are received by the set-top box, the logic/display control detects escape sequences contained within the video signals and determines whether the demarcated data is of the type identified by the viewer. If so, the set-top box automatically captures the telephone number data (step 415). In other cases, it may be valuable for the service provider 26 to encode information, such as time, date, channel, etc., as "other data" 325. Such data could be automatically transmitted upon connecting a call to the service provider.

As described above with respect to FIG. 2, the viewer can affirmatively select to capture telephone number data as the viewer is watching the program. The viewer can communicate his request by transmitting a particular access code from his remote control unit or telephone (step 425). The access code is illustratively a universal access code which is the same regardless of the program being broadcast.

Once the telephone number data has been captured by the set-top box (step 430), DTMF tones can be generated from the telephone number data and a call placed to the service provider (step 440). Once the viewer is connected to the service provider (step 445), the viewer can interact directly with the service provider to, for example, order merchandise, or obtain information about a particular service. During the interactivity, the other data 325 may be automatically transmitted, e.g. via DTMF, signals, to service provider 26 to identify information such as, but not limited to, product name, commercial, time, date, channel, credit information, billing address, and shipping address.

Alternatively, the telephone number data are stored in memory for later retrieval (step 450). Referring to FIG. 5, if more than one telephone number has been stored in memory (step 460), a history log of the stored telephone numbers may be assembled and displayed on the viewer's display device (step 465) as illustrated in FIG. 6. The display 605 may include among other things, the name of the service provider, the type of service or product advertised and the telephone number. The viewer can download the history log from the set-top box to the viewer's display by transmitting an appropriate instruction from his remote control unit. The logic/display control then retrieves all of the data which are stored in memory which represents the telephone number data, and the data such as service provider name and company name. The data are transmitted to the display device via the video interface. The viewer can select one of the displayed telephone numbers to be dialed by transmitting an instruction from either his remote control unit or telephone (step 470). The logic/display control then retrieves the selected telephone number data from memory (step 475). The set-top box transmits the dialing sequence over the telephone network to connect the call (step 480). The viewer is connected to the service provider as described above (step 485).

The ability to generate a history log can make certain of the viewer's tasks easier by providing listings of telephone numbers for similar services. For example, the viewer may be in the process of purchasing a new home and may capture the telephone numbers of realtors showing homes that interest the viewer. By inputting display instructions via the remote control unit, a display of the realtors' telephone numbers is provided on the screen of the display device. Included with each telephone number may be additional information such as, the realtor's name, and the address of the home being advertised for sale. The viewer can then retrieve the telephone number of one of the realtors and have it dialed by the set-top box by inputting the appropriate access instruction via the remote control unit. Once the realtor is reached, the viewer can schedule an appointment to see the home or obtain additional information about the house.

It will be appreciated that those skilled in the art will be able to devise numerous and various alternative arrangements which, although not explicitly shown or described herein, embody the principles of the invention and are within its scope and spirit.

We claim:

1. A method comprising the steps of:

receiving video signals transmitted over a network;

identifying an escape sequence signal encoded within the video signals, said escape sequence signal demarcating telephone number data, and said escape sequence signal being perceptually invisible;

capturing the demarcated telephone number data; and transmitting the captured telephone number data over a telephone network to initiate a telephone call.

2. The method of claim 1 wherein said step of capturing said telephone number data comprises the steps of:

storing the captured telephone number data in memory; and retrieving the captured telephone number data from memory in response to a received access code.

3. The method according to claim 2 wherein the step of storing the captured telephone number data comprises:

storing other data which defines information relating to the telephone number data.

4. The method according to claim 2 further comprising the step of:

indicating the capture of telephone number data.

5. An interactive communication system comprising:

means for transmitting video signals from at least one central provider to a plurality of video receiving devices, each of said video receiving devices comprising:

means for receiving said video signals;

means for capturing telephone number data encoded into said video signals by identifying an escape sequence signal encoded within said video signals demarcating said telephone number data, where said escape sequence signal is perceptually invisible; and means for transmitting dialing information corresponding to said captured telephone number data over a telephone network to initiate a telephone call.

6. The device of claim 5 wherein said receiving means is a set-top box.

7. The device of claim 5 wherein said capturing means can be selectively enabled and disabled.

8. The device of claim 5 further comprising means for indicating the capture of telephone number data.

9. The device according to claim 8 wherein said indicating means is an LED indicator.

10. The device of claim 6 further comprising means for storing said captured telephone number data.

11. The device according to claim 5 wherein said telephone number data includes other data which defines information relating to the telephone number data.

12. A video receiving device comprising:

means for receiving video signals;

means for capturing telephone number data encoded into said video signals by identifying an escape sequence signal encoded within said video signals demarcating said telephone number data where said escape sequence signal is perceptually invisible, said telephone number data representing more than one telephone number, each telephone number being identified by a separate escape sequence signal; and means for transmitting DTMF tones corresponding to the telephone number data for a particular telephone number over a telephone network to initiate a telephone call.

13. The device of claim 12 wherein said receiving means is a television.

14. The device of claim 12 wherein said receiving means is a computer.

15. The device of claim 12 wherein said capturing means can be selectively enabled and disabled.

16. The device of claim 12 wherein said receiving means includes a set-top box.

17. The device of claim 12 wherein said capturing means comprises storing means for storing said telephone number data.

18. The device of claim 17 further comprising means for assembling a history log of said stored telephone number data, means for displaying said history log; and means for selecting telephone number data from said history log which represents a particular telephone number.

19. The device of claim 12 further comprising means for indicating the capture of telephone number data.

20. The device of claim 19 wherein said indicating means is an LED indicator.

21. The device of claim 12 wherein said telephone number data includes other data which defines information relating to the telephone number data.

22. A method comprising the steps of:

receiving video signals transmitted over a network;

capturing telephone number data encoded into said video signals by identifying an escape sequence signal encoded within said video signals demarcating said telephone number data where said escape sequence signal is perceptually invisible, said telephone number data representing a plurality of telephone numbers, said telephone number data representing each telephone number being identified by a separate escape sequence signal; and transmitting DTMF tones corresponding to said captured telephone number data for a particular telephone number over a telephone network to initiate a telephone call.

23. The method according to claim 22 wherein said step of capturing the telephone number data comprises the steps of:

storing the captured telephone number data in memory; and retrieving the captured telephone number data from memory in response to a received access code.

24. The method according to claim 23 wherein said step of storing said captured telephone number data comprises the step of:

assembling a history log of the telephone numbers represented by the telephone number data stored in memory.

25. The method according to claim 24 further comprising the steps of:

displaying said history log;

initiating the dialing of a particular telephone number in response to a selection of the particular telephone number from the history log.

\* \* \* \* \*